3 Sheets—Sheet 2.
A. J., R. R., & E. J. WISE.
COMBINED HARVESTER AND THRASHER.
No. 188,456. Patented March 13, 1877.
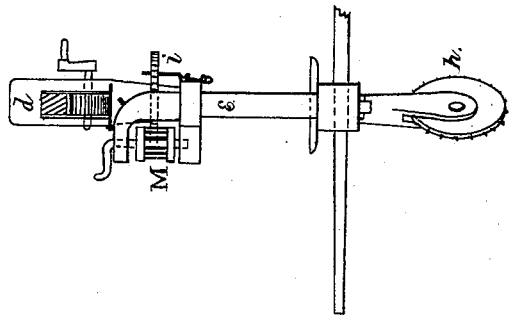
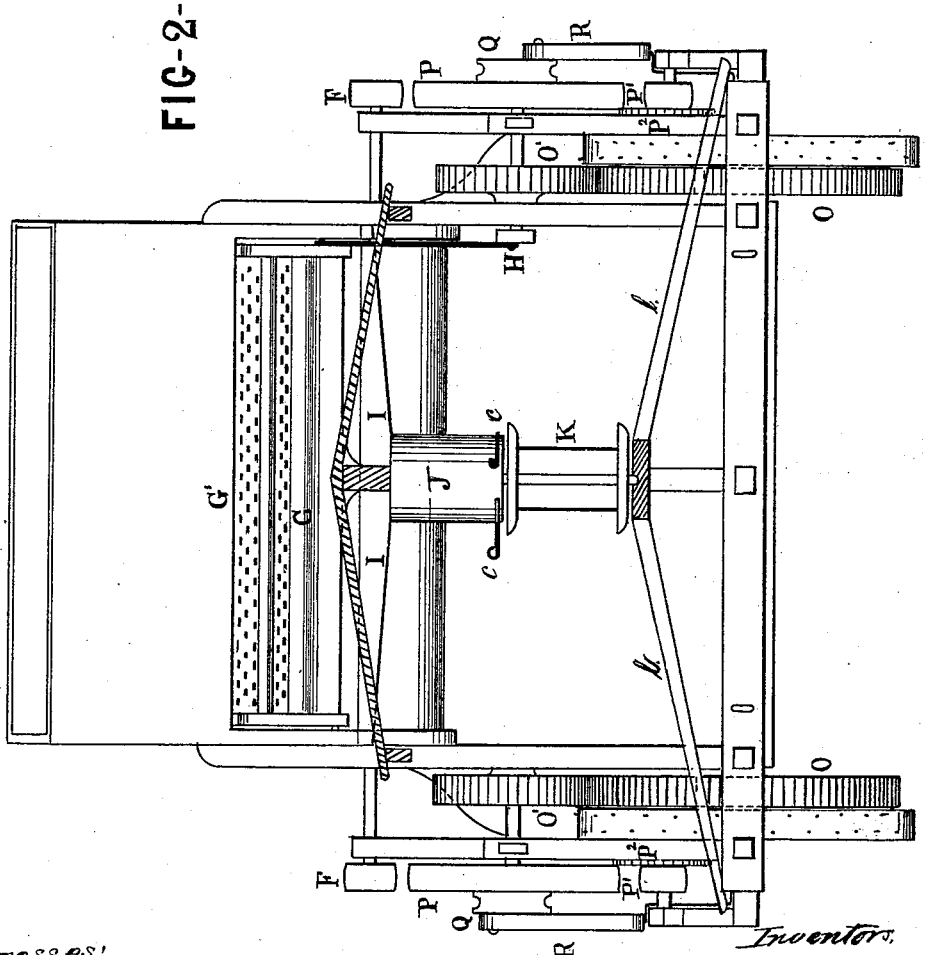

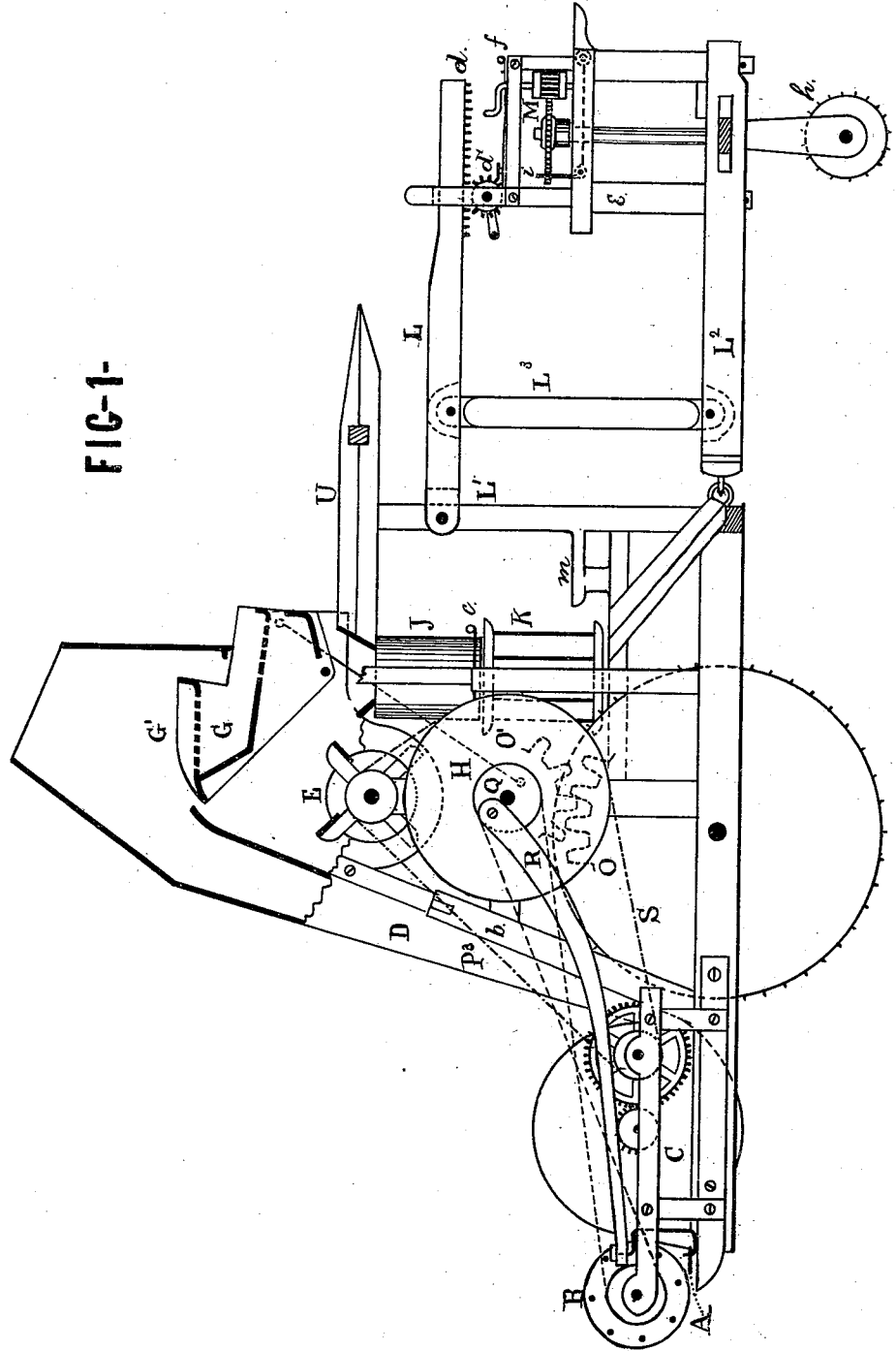

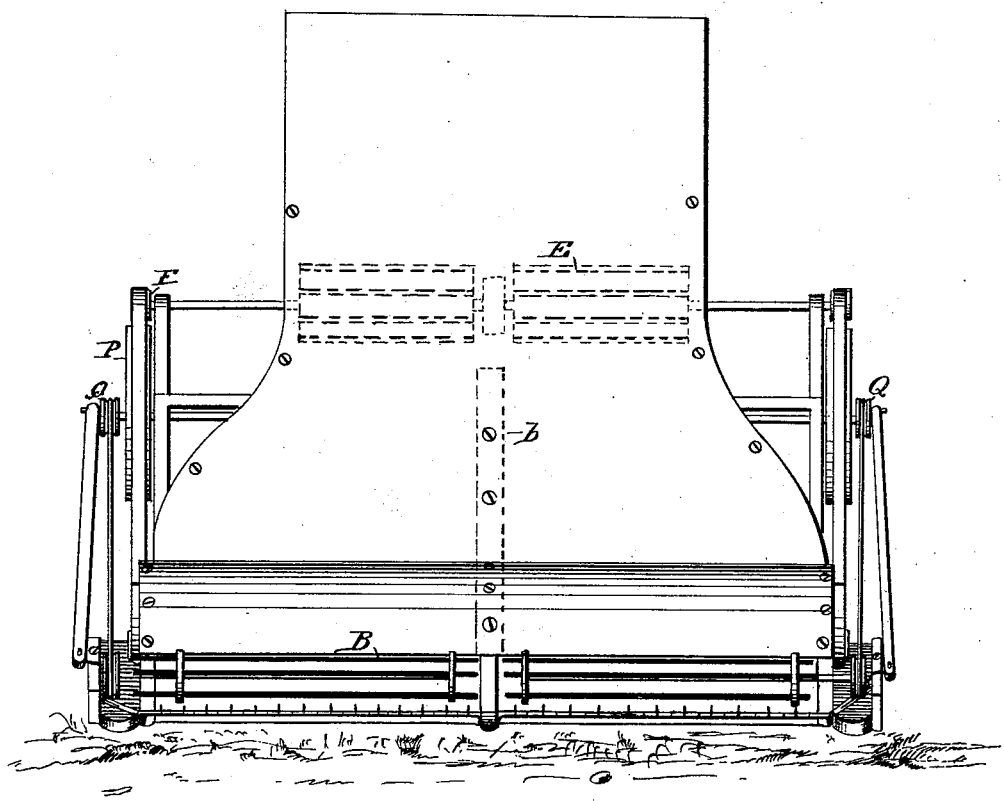

UNITED STATES PATENT OFFICE.

ANDREW J. WISE, REUBEN R. WISE, AND EBENEASER J. WISE, OF VACA STATION, CALIFORNIA.

IMPROVEMENT IN COMBINED HARVESTER AND THRASHER.

Specification forming part of Letters Patent No. 188,456, dated March 13, 1877; application filed August 25, 1876.

*To all whom it may concern:*

Be it known that we, ANDREW J. WISE, REUBEN R. WISE, and EBENEASER J. WISE, of Vaca Station, in the county of Solano and State of California, have invented an Improvement in Machines for Cutting, Thrashing, Separating, and Sacking Grain; and we do hereby declare that the following is a full, clear, and exact description of the same, reference being had to the annexed drawings, and to the letters marked thereon, of which—

Figure 1, Sheet 1, represents a side sectional elevation; Fig. 2, Sheet 2, a transverse section, taken in the rear of the driving wheels and mechanism; Fig. 3, Sheet 2, an elevation of the device for guiding and balancing the machine. Fig. 4 is a front elevation.

The object of our invention is to provide means whereby the grain, as soon as it is cut, enters the thrashing-cylinders, from whence it is drawn up by suction upon the riddles or screens.

The straw is also drawn up with the grain, and, being lighter, is carried out through openings at the top of the machine, while the grain falls into a receptacle, from whence it is sacked.

It consists mainly of double sickles or cutters, immediately back of which is placed a double concave with separate chambers extending from each concave to near the riddles or screens.

Beneath the riddles, but having no connection with them, are placed digesting-fans, one for each chamber.

The grain, as it comes from the riddles, is received by spouts, which conduct it into a receptacle for sacking.

The machine is balanced by a rack and pinion, and guided by the ordinary steering-wheel, with novel means for controlling it, all of which, with other details of construction and operation, will be more fully described hereinafter.

In the drawings, A represents the sickles or cutters, which are constructed much in the usual manner, with reels B in position for use, if found necessary.

The cylinders C are placed in the immediate rear of the sickles, and are provided with four or more blades or fans, so that as great a draft of air may be taken in with the grain as it is possible when being cut.

Back of the concave extends upward an almost vertical case or chamber, D, which is constructed with an air-tight front. This chamber is divided into compartments by a vertical partition, $b$, which extends from near the double fans to the toe of the machine, so that the grain received into one concave will be drawn up in one chamber and that received in the other concave will be drawn up in the opposite chamber, both chambers being in the immediate rear of each concave.

The suction or digesting fans E also occupy separate compartments, and are driven by separate shafts and pulleys F. They communicate with the compartments formed by partition $b$ of the chamber and occupy a space beneath the riddles.

The top extension of the rear part of the case composing the chamber is made slightly oval, so as to fit as closely as possible against the riddle G', and permit the riddles G and G' to receive the proper motion, which motion is produced by the crank-rod and rotating disk H.

Beneath the riddles are placed inclined spouts I I, so that the grain can be directed into the receptacle or hopper J, which is provided with feeding-slides $c\,c$ at each side, which communicate with holes or openings in the rotating spool K, to which the sacks to be filled are attached.

The machine is balanced by a horizontal bar, L, connected by a pin to the vertical brace $L^1$ attached to the machine, its opposite end being provided with a rack, $d$, and pinion $d'$, operating in the post $e$. This bar has a jointed connection with the beam or pole $L^2$ by means of the brace $L^3$.

The pinion is held by a small crank-lever, $f$, which engages the teeth of said pinion. By this means the operator having his seat at $g$ can, by his own weight and the moving of the rack, maintain an exact balance of the machine and direct the cutters or sickles at the proper angle for cutting the grain to the best advantage.

For steering or directing the machine a wheel, h, of the ordinary construction is employed. This is operated by a crown-wheel and pinion, M, and is held in position by a crank-lever, i, engaging the teeth of the crown-wheel.

The post or brace L³ is beveled at both ends, by which the cross-bar connection with the machine by hooks and eyes, the necessary play of the lever or bar L is had in passing over rough places or when balancing the machine.

Each of the driving-wheels is provided with pins to prevent slipping, and to their inner faces are connected toothed wheels O. These wheels drive the spurs O' O' to the ends of the shafts of which are connected the pulleys P P and grooved rotating disks Q Q, to which the cranks R, which drive the sickles, are attached.

The belts S operate the fans and concaves by passing around both the pulleys P P and pulleys P¹, which latter give motion to the concave by means of spurs and pinions P², while the belts P³ drive the reels.

The operation of our machine may be described as follows, to wit: The motive power is applied to the driving-beam L² in the usual way, which carries the sickle against the standing grain, which cuts it, and by the operation of the cylinders and the suction or digesting fans, together with a forward movement of the machine, a sufficient draft of air is had to draw up the grain and straw from the concaves, after it is thrashed, into the ways or chambers, and expel the straw, through the exit-spout, upon the canvas u, and off upon the ground, while the grain, being of greater specific gravity, will fall upon the screens or riddles, and drop into the inclined trough or chutes I, to be sacked from the reservoir, to which they are connected, and from which the sacks are permitted to slide off to the ground upon inclined ways l l, through the instrumentality of an attendant, who may occupy the seat m under the canvas u, which protects him and the horses from the falling straw and chaff.

Having thus described our invention, what we claim as new, and desire to secure by Letters Patent, is—

1. The combination of the double case or chamber D, the independent digesting-fans E, and the independent mechanism for driving the same, consisting of the shafts and pulleys F, belts S, and pulleys P P¹, receiving motion from the independent driving-wheels, substantially as described.

2. In combination with the main portion of the machine, the balancing portion consisting of the pivoted bars L L² L³, the rack and pinion d d', and the guiding-wheel mechanism, substantially as described.

In witness whereof we have hereunto set our hands and seals.

ANDREW JACKSON WISE. [L. S.]
REUBEN RAYNE WISE. [L. S.]
EBENEASER JACKSON WISE. [L. S.]

Witnesses:
JAMES HART,
G. W. WARE.